(12) United States Patent
Fomenko et al.

(10) Patent No.: US 6,813,641 B2
(45) Date of Patent: Nov. 2, 2004

(54) TEAMWARE SERVER WORKING OVER HTTP/HTTPS CONNECTIONS

(75) Inventors: Anatoli Fomenko, San Jose, CA (US); Sadhana S. Rau, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 663 days.

(21) Appl. No.: 09/899,473

(22) Filed: Jul. 5, 2001

(65) Prior Publication Data
US 2003/0009476 A1 Jan. 9, 2003

(51) Int. Cl.[7] .............................................. G06F 13/00
(52) U.S. Cl. ...................... 709/230; 709/203; 709/217; 709/225; 709/302
(58) Field of Search ................................. 709/200, 201, 709/203, 204, 205, 217, 218, 219, 220, 221, 225, 226, 227, 229, 230, 231, 300, 302, 303–305

(56) References Cited

U.S. PATENT DOCUMENTS

| 5,928,323 | A | | 7/1999 | Gosling et al. ............. 709/203 |
| 6,098,093 | A | * | 8/2000 | Bayeh et al. ................ 709/203 |
| 6,463,457 | B1 | * | 10/2002 | Armentrout et al. ........ 709/201 |
| 6,591,272 | B1 | * | 7/2003 | Williams ..................... 707/102 |
| 6,604,106 | B1 | * | 8/2003 | Bodin et al. ................. 707/101 |
| 6,735,771 | B1 | * | 5/2004 | Houlding .................... 719/315 |

* cited by examiner

*Primary Examiner*—Moustafa M. Meky
(74) *Attorney, Agent, or Firm*—Osha & May L.L.P.

(57) ABSTRACT

A system for remotely accessing a resource in a network having a client-side and a server-side includes a server application having at least one server object that can access the resource, a client application comprising an interface through which a method of a proxy object can be called locally and converted to a request, a servlet that delegates processing of the request to the server object, and a connection for sending the request to the servlet.

24 Claims, 4 Drawing Sheets

TEAMWARE SERVER WORKING OVER HTTP/HTTPS CONNECTIONS

BACKGROUND OF INVENTION

1. Field of the Invention

The invention relates generally to "teamware," a category of software that enables a team of people, especially people distributed over multiple locations, to collaborate on projects. More specifically, the invention relates to methods and systems for executing transactions between teamware workspaces.

2. Background Art

One of the major challenges in developing large-scale (multi-platform) software is coordinating the activities of a team of people, i.e., developers, testers, technical writers, and managers. To improve productivity, time-to-market, and quality of the software, the various phases of the development life cycle typically evolve concurrently, i.e., in parallel. Concurrent software development requires that the developers have access to common software base for the purpose of developing and building the software. The main challenge with this type of development process is how to control access to the software base and track the changes made to the software base so that the integrity of the software base is maintained. It should be noted that at any point in time, various configurations of the software base may exist because the various phases of the development cycle are evolving concurrently.

Most development teams use a Software Configuration Management (SCM) system to manage the software base. SCM systems, such as Concurrent Versions System (CVS), track the changes made to the files under their control and facilitate merging of code. Sophisticated SCM systems, such as Rational® ClearCase® from Rational Software Corporation and Forte™ TeamWare from Sun Microsystems, Inc., provide other capabilities such as software building and process management (e.g., what changes can be made to the software base and who can make the changes).

SCM systems, such as Forte™ TeamWare, allow creation of one or more isolated workspaces (also known as sandbox). The term "workspace," as used herein, refers to a directory, its subdirectories, and the files contained in those directories. Typically, the files are maintained under a version control system, such as Source Code Control System (SCCS) or Revision Control System (RCS). To use Forte TeamWare, for example, the developers initially place their project directories and files (if available) in one high-level directory. Forte™ TeamWare then transforms the high-level directory into a top-level (or parent) workspace. If project directories and files are not available, an empty parent workspace is created. After creating the parent workspace, the developers create their own child workspaces with copies of the parent workspace files. The developers can then modify individual versions of the same file in their child workspaces without interfering with the work of other developers. After the files are modified in the child workspaces, they are merged and copied to the parent workspace. Merging of files generally involves resolving conflicts between individual versions of the same file.

Transactions between a child workspace and a parent workspace generally revolve around three relationships: bring over files from the parent workspace, modify files in the child workspace, and put back files to the parent workspace. Forte™ TeamWare (version 6) as currently implemented only supports transactions between two local workspaces. Two workspaces are "local" if local access methods or standard network file sharing protocols, such as Network File System (NFS) on UNIX® or Server Message Block (SMB) on Windows®, can be used to transfer files between the workspaces. NFS, for example, operates as a client-server application. A computer that shares its resources with other computers on the network using the NFS service is known as an NFS server. The computers sharing the resources of the NFS server are known as NFS clients. Using NFS service, a resource physically linked to a NFS server may be NFS mounted. Once the resource is NFS mounted, it becomes accessible to all NFS clients as if it were stored locally at each client. Similarly, SMB server provides file sharing services to SMB clients.

Typically, the parent workspace is located on a different machine than the one on which the child workspace is located. In this arrangement, the computer on which the parent workspace resides can be referred to as a server, and the computer on which the child workspace resides can be referred to as a client. Thus, if the server is a UNIX® system and the client is a Windows® system, either the server would have to install an implementation of SMB or the client would have to install an implementation of NFS to execute transactions between the workspaces. In other words, both the server and client are required to have an implementation of the same file sharing protocol to execute transactions between the workspaces. This may not always be possible or convenient because there are several operating systems on the market and an implementation of a particular file sharing protocol may not be available for all operating systems. In this situation, a mechanism that allows transactions between workspaces to be executed regardless of the operating system of the client and server computers is desired.

SUMMARY OF INVENTION

In one aspect, the invention relates to a method for remotely accessing a resource in a network having a client-side and a server-side. The method comprises calling a method of a proxy object at the client-side, converting the call for the method of the proxy object to a request, transmitting the request to the server-side, and invoking a servlet at the server-side to generate a response to the request. The servlet delegates processing of the request to a server object having access to the resource.

In another aspect, the invention relates to a method for executing transactions in a network having a client-side and a server-side. The method comprises requesting access to a remote workspace by calling a method of a proxy object at the client-side, converting the call for the method of the proxy object to a request, transmitting the request to the server-side, and invoking a servlet at the server-side to generate a response to the request. The servlet delegates processing of the request to a server object having access to the remote workspace.

In another aspect, the invention relates to a method for executing transactions in a network having a client-side and a server-side. The method comprises requesting access to a remote resource by calling a method of a proxy object at the client-side, converting the call for the method of the proxy object to a request, transmitting the request to the server-side using HTTP protocol, and invoking a servlet on the server-side to generate a response to the request. The servlet delegates processing of the request to a server object having access to the remote resource.

In another aspect, the invention relates to a system for remotely accessing a resource in a client-server network.

The system comprises a server application having at least one server object that can access the resource, a client application comprising an interface through which a method of a proxy object can be called locally and converted to a request, a servlet that delegates processing of the request to the server object, and a connection for sending the request to the servlet.

In another aspect, the invention relates to a software configuration management system which comprises a server application having at least one server object that can access a workspace, a client application comprising an interface through which a method of a proxy object can be called locally and converted to a request, a servlet that delegates processing of the request to the server object, and a connection for sending the request to the servlet.

Other aspects and advantages of the invention will be apparent from the following description and the appended claims.

DETAILED DESCRIPTION

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
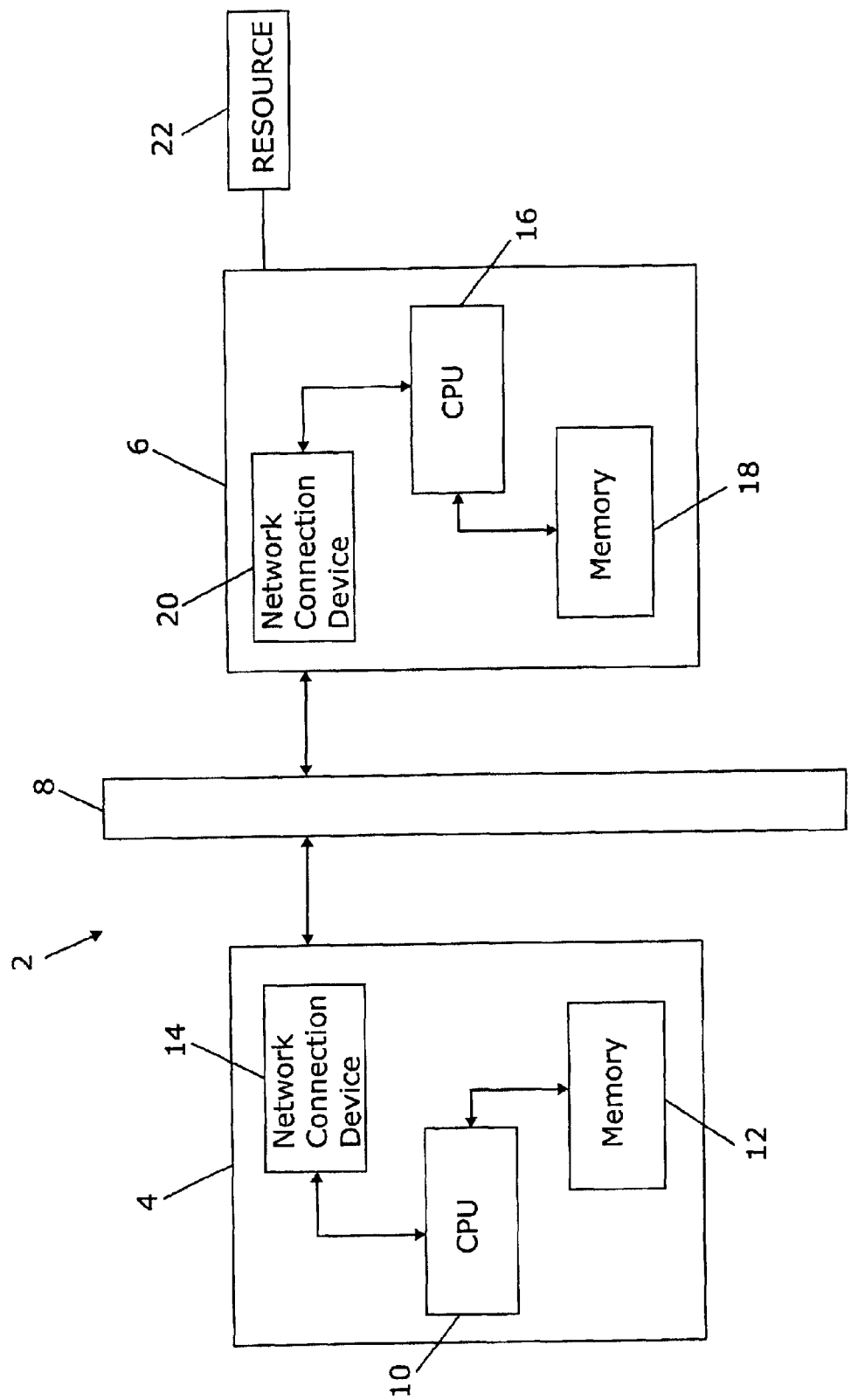
FIG. 1 is a block diagram of a client-server network.

Referring now to the accompanying drawings, FIG. 1 shows a block diagram of a client-server network 2 suitable for practicing the invention. The client-server network 2 includes a client machine 4 and a server machine 6. The client machine 2 and server machine 6 are connected by a transmission channel 8, which may be a wire or wireless transmission channel. The client machine 4 may be any standard computer system running any standard operating system, such as Microsoft Windows® 2000, Windows® NT, UNIX®, Solaris®, and so forth. The client machine 4 includes standard computer components such as CPU ("Central Processing Unit") 10, (primary and/or secondary) memory 12, and network connection device 14. The server machine 6 may be any standard computer system, such as sold under the trade name Ultra™ 10 Workstation by Sun Microsystems, Inc., Palo Alto, Calif. The server machine 6 includes standard server components such as CPU 16, (primary and/or secondary) memory 18, and network connection device 20.

The client-server network 2 includes one or more resources 22 (only one is shown) which may be installed on the server machine 6 or on another server machine (not shown) in the client-server network 2. The term "resource" typically means any disk drive, printer, peripheral device, directory, program file, or data that can be shared among users on a network. In the context of software configuration management, the term "resource" would generally refer to a workspace or repository containing components of a software product (i.e., shared and interdependent source files) stored in a computer memory, such as memory 18, or on a secondary storage device (not shown), such as disk, CD-ROM, DVD, and so forth. Multiple users on client machines, such as client machine 4, can access and make modifications to the software product. Typically, some form of version control, such as SCCS ("Source Code Control System"), is used to keep track of the changes made to the files.

Figure 2:
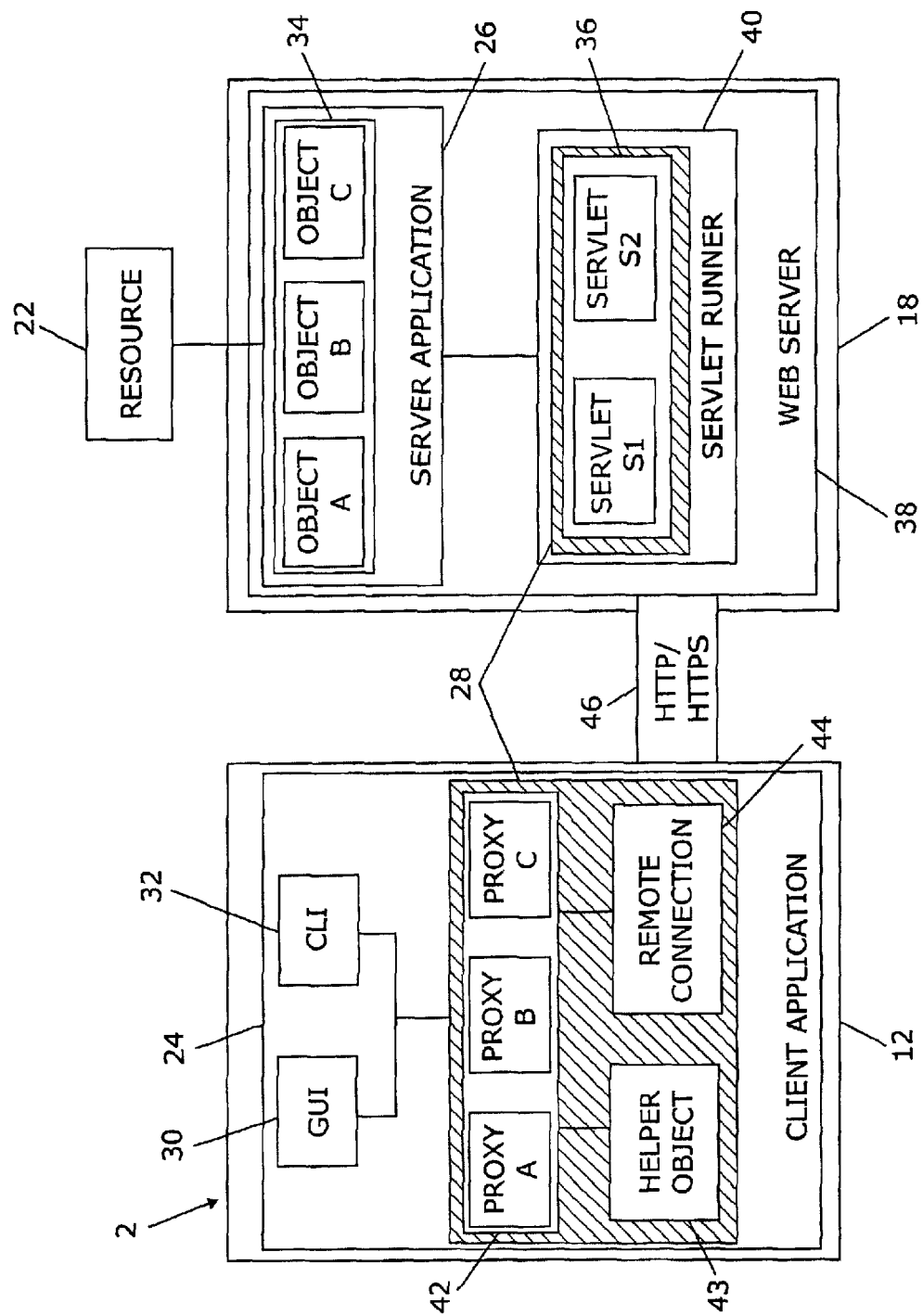
FIG. 2 is a block diagram of a system for remotely accessing a resource in a client-server network.

FIG. 2 shows a system for remotely accessing the resource 22 in the client-server network 2. For convenience and clarity, not all the parts of the client-server network 2 are shown in FIG. 2. The system includes a client application 24, a server application 26, and a communication layer 28 between the client application 24 and the server application 26. In one embodiment, the client application 24 is stored in memory 12 and provides a Graphical User Interface (GUI) 30 and/or a Command Line Interface (CLI) 32 through which a user can remotely access the resource 22. In one embodiment, the server application 26 is stored in memory 18 and includes server-side objects, collectively indicated at 34, which can directly access the resource 22 using local access methods or standard network file sharing protocols, such as NFS or SMB. It should be noted that the number of server-side objects 34 is arbitrary and will depend on the programmer's implementation of the system. For a single-user system, it is also possible to have the client application 24, server application 26, and resource 22 installed on the same host machine. In this case, the host machine serves as both the client machine and server machine.

In one implementation, the client application 10 and the server application 26 are Java™ applications. A Java™ application is made up of one or more classes compiled into an architecture-neutral machine code, commonly known as bytecodes. The Java™ application is executed by running another program called a Java™ Virtual Machine (JVM). When executing the Java™ application, the JVM is invoked, causing the class loader (not shown) to load the bytecodes in the application into memory. A bytecode verifier (not shown) confirms that all bytecodes are valid and do not violate Java's security restrictions. Then the JVM reads the bytecodes and interprets them into a language that the computer can understand.

The communication layer 28 is responsible for marshaling and unmarshaling requests made by client application 24 and responses generated by server application 26. The term "marshaling" is the process of packing one or more items of data into a message buffer, prior to transmitting that message buffer over a communication channel. The term "unmarshaling" is the process of unpacking a marshaled stream. On the server-side, the communication layer 28 includes servlets 36. Each servlet 36 is a piece of software code which is used to dynamically generate information. Servlets are typically written in Java™, but they could also be written in other programming languages. Once the servlets are instantiated, they process requests in a continuous loop until they are destroyed. As will be further explained below, the servlets 36 parse requests from the client application 24 and delegate processing of the requests to an appropriate one of the server-side objects 34 in the server application 26. It should be noted that the number of servlets 36 is arbitrary and would depend on the programmer's implementation of the system.

The servlets 36 are deployed on a web server 38. In the illustration, the web server 38 is stored in memory 18 of the server machine 6. In alternate embodiments, the web server 38 or a portion of the web server 38 may be stored on a secondary storage device (not shown), such as a disk, CD-ROM, DVD and so forth. The web server 38 may be any standard web server having an integrated or plug-in servlet container 40. One example of a web server which includes a servlet container is Tomcat, version 3.2.1. Tomcat is an open-source software project jointly run by Apache Software Foundation and Sun Microsystems, Inc.

On the client-side, the communication layer 28 includes client-side proxy objects, collectively indicated at 42. In one embodiment, each of the proxy objects 42 corresponds to one of the server-side objects 34 and implements all of the interfaces of the corresponding server-side object 34. The communication layer 28 keeps track of which client-side proxy object 42 corresponds to which server-side object 34. For example, special ids, such as session_id for client session, workspace_id for workspace to be accessed, and transaction_id for type of transaction, can be present in client/server calls. The special ids can then be used to map client-side proxy objects to server-side objects. In one embodiment, the client-side proxy objects 42 are Java™ classes and run in the same JVM (not shown) as the client application 24.

In one embodiment, the underlying communications protocol used in the communication layer 28 is HTTP (or HTTPS) protocol. HTTP ("Hypertext Transfer Protocol") is an application-level protocol used in connecting servers and clients (browsers) on the World-Wide Web. HTTP is based on a request-response paradigm and uses TCP ("Transmission Control Protocol") connections to transfer data. HTTPS ("Hypertext Transfer Protocol Secure") is a variant of HTTP that implements the SSL ("Secure Sockets Layer") mechanism. SSL is a standard protocol developed by Netscape Communications Corporation for implementing cryptography and enabling secure transactions on the Web. SSL uses public key signatures and digital certificates to authenticate a server and client and provides an encrypted connection for the client and server to exchange messages securely.

The GUI 30 or CLI 32 calls a method of one of the proxy objects 42, passing parameters to the proxy object 42 in a manner similar to passing parameters for a conventional procedure call. For example, the method may be instructions to bring files over from a remote workspace on the server machine 6 to a local workspace on the client machine 4. The proxy object 42 passes the parameters to a helper object 43, which analyzes the parameters, marshals the parameters into a predetermined message format, and converts the method call into a HTTP request. The HTTP request includes HTTP headers and objects (if the request method takes objects as parameters) or an input stream (if the request method takes an input stream as a parameter). The requested method would take an input stream as a parameter, for example, if a file is to be returned as part of the response to the GUI 30 or CLI 32. The HTTP headers include information such as the request method, the marshaled parameters, the ID of the client-side proxy 42, and the protocol version. The HTTP request also includes a URL ("Uniform Resource Locator") which specifies the address of the web server 38 and the servlet that will handle dispatching of the request to the appropriate server-side object 34. The communication layer 28 includes a remote connection object 44 on the client-side that is responsible for setting up and managing the remote connection 46 between the client application 24 and the server application 26.

Figure 3:
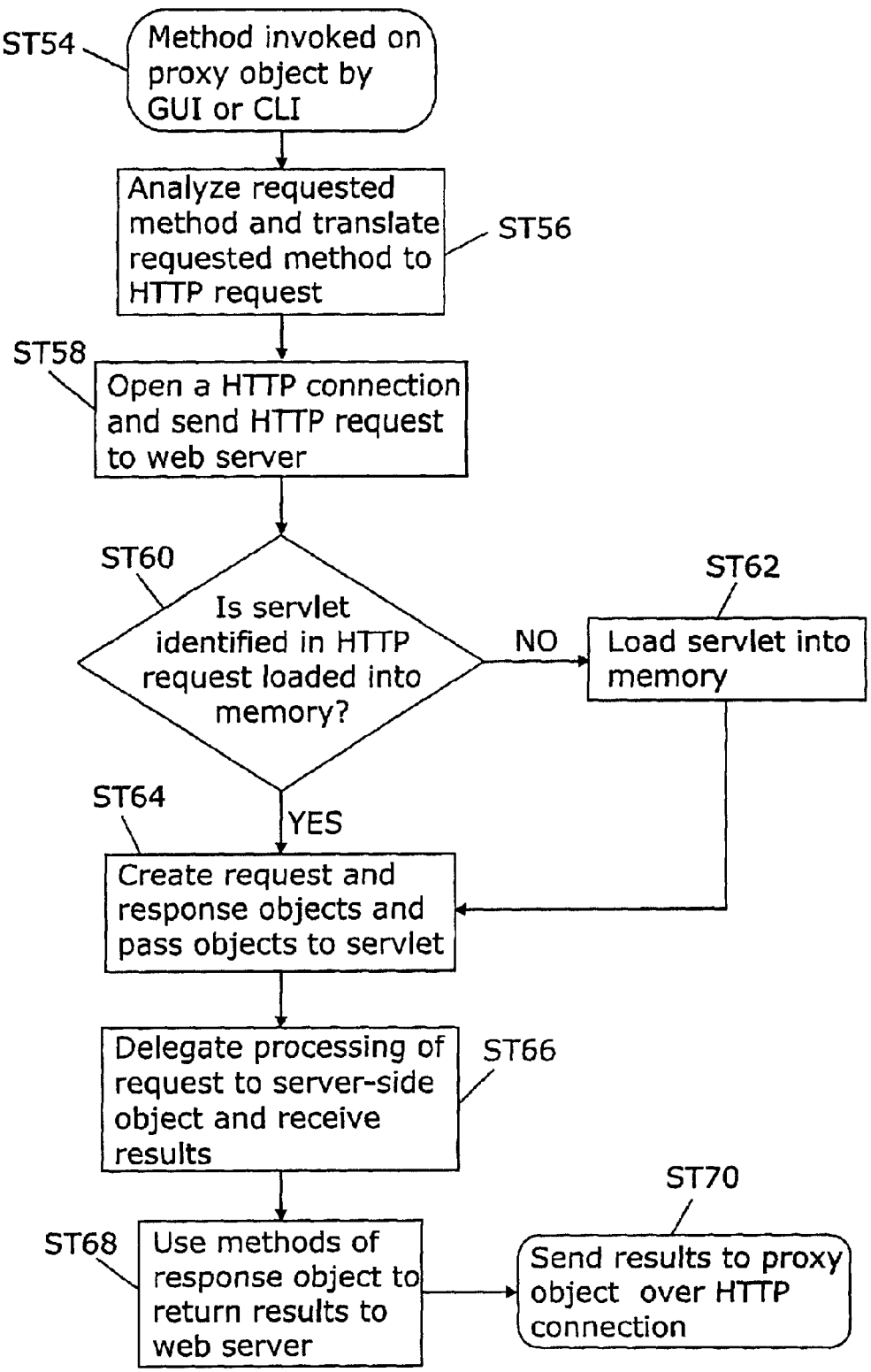
FIG. 3 is a flowchart illustrating a method for remotely accessing a resource in a client-server network.

In operation, the GUI 30 or CLI 32 invokes a method on one of the client-side proxy objects 34, e.g., client-side proxy A, (ST54 in FIG. 3). Client-side proxy A intercepts the function call, analyzes the requested method, and uses the helper object 43 to generate a corresponding HTTP request (ST56 in FIG. 3). The client-side proxy A then opens the connection 46 and transmits the HTTP request to the web server 38 (ST58 in FIG. 3). The HTTP request specifies that one of the servlets 36, e.g., servlet S1, should handle the request. The web server 38 checks if the servlet S1 has been loaded into memory 18 (ST60 in FIG. 3). If the servlet S1 has not been loaded, the web server 38 loads and creates an instance of the servlet S1 (ST62 in FIG. 3). The web server 38 then calls the init method of the servlet S1 to initialize the servlet S1. The init method is called only once during the lifetime of the servlet. Once the servlet S1 is instantiated, the requests to the servlet S1 are processed in a continuous loop until the web server 38 is shut down or a destroy method is called on the servlet S1. After initializing the servlet B, the web server 38 creates a request object (not shown) and a response object (not shown). In Java™ servlets, there are classes HttpServletRequest and HttpServletResponse that handle HTTP request/response operations. The web server 38 invokes the service method of the servlet S1, which takes the request object and the response object as parameters (ST64 in FIG. 3). These parameters encapsulate the data sent by the client-side proxy A, thereby allowing the servlet S1 to report status information, such as errors.

The servlet S1 invokes methods from the request object in order to discover information about the environment of the client application 24, the environment of the web server 38, and all the information provided by the client application 24. A more detailed discussion of how servlets operate can be found in U.S. Pat. No. 5,928,323 issued to Gosling et al., entitled "Apparatus and Method for Dynamically Generating Information with Sever-side Software Objects," and assigned to the assignee of the present invention. The servlet S1 delegates processing of the request to an appropriate one of the server-side objects 34, e.g., server-side object A (ST66 in FIG. 3). The server-side object A processes the request and returns the result to the servlet S1. The servlet S1 prepares the response and invokes methods for the response object to send the response back to the Web server 38 (ST68 in FIG. 3). The web server 38 then sends the response to the client-side proxy A over the connection 46 (ST70 in FIG. 3). The client-side proxy A closes the connection 46 after it receives the response. The client-side proxy A passes the results to the object making the function call, i.e., GUI 30 or CLI 32.

Typically, the servlets 36 perform authentication before handling a task, i.e., before delegating processing of a request to the server-side objects 34. The term "authentication" refers to the process by which one subject, which may be a user or a computing service, verifies the identity of another subject in a secure fashion. This process typically involves the subject demonstrating some form of evidence, such as a password or signed data using a private key, to prove its identity. Depending on the security parameters of a particular service, different kinds of proof may be required for authentication. In one embodiment, the system uses a multi-layer pluggable architecture for authentication. This architecture allows administrators to plug in the appropriate authentication services to meet their security requirements. Also, the architecture enables the server-side objects 34 to remain independent from the underlying authentication services. Hence as new authentication services become available or as current services are updated, administrators can easily plug them in without having to modify or recompile the server-side objects 34.

Figure 4:
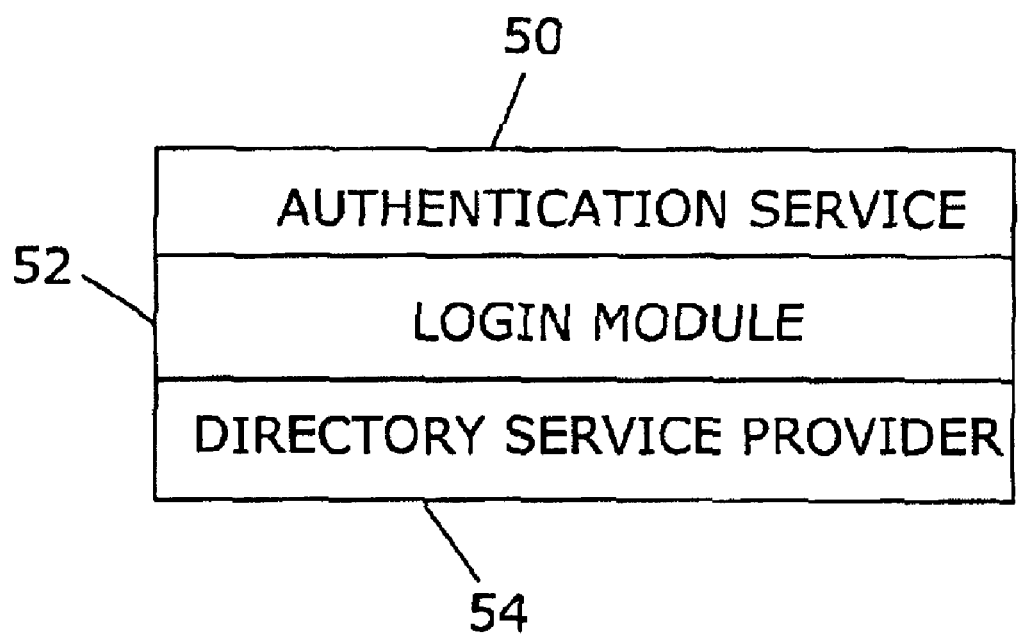
FIG. 4 is a block diagram of an authentication mechanism for use in the system shown in FIG. 2.

In one embodiment, as shown in FIG. 4, the upper layer 50 of the authentication architecture is based on Java Authentication and Authorization Service (JAAS). JAAS is a framework and programming interface that augments the Java™ platform with both user-based authentication and access control capabilities. Additional information about JAAS is available from Sun Microsystems, Inc., both in print and via the Internet at "java.sun.com." Also, see Charlie Lai et al., User Authentication and Authorization in the Java™ Platform, Proceedings of the 15th Annual Computer Security Applications Conference, Phoenix, Ariz., December 1999.

Below the upper layer 50 is a pluggable login module 52 that determines the authentication service. The pluggable login module 52 may be a standard pluggable login module, such as Java Naming and Directory Interface™ (JNDI) login module, or may be a specific login module created by the user. For cross-tier functionality, the login layer 52 includes a pluggable service provider 54, such as Network Information Services (NIS) or Lightweight Directory Access Protocol (LDAP) for directory lookups.

The login context of the JAAS layer 50 performs the authentication steps in two phases. In the first phase, the login context invokes the login module 52 and instructs the login module 52 to attempt authentication. If the login module 52 successfully passes this phase, the login context then formally instructs the login module 52 to complete the authentication process. During this phase, the login module 52 associates the relevant authenticated principals (names) and credentials with the subject. A "credential" is a security-related attribute such as password, Kerberos ticket, public key certificate, and cryptographic key. JAAS defines a security policy to specify what resources are available to authorized principals.

The invention provides several advantages. Using the system described above, transactions can be executed between two workspaces, regardless of the operating system of the machines on which the workspaces are located. In other words, the transactions can be executed between two workspaces when local access methods or network file sharing protocols, such as NFS or SMB, are not available to transfer data between the two workspaces. Using HTTP/HTTPS connections for remote access allows the server application to be deployed across the Internet or intranet. Using HTTP/HTTPS connections will also ensure more security than, for example, using socket-based connections. This is because a fully debugged SSL implementation that can send encrypted information is readily available for these connections.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for remotely accessing a resource in a network having a client-side and a server-side, comprising:
    calling a method of a proxy object at the client-side;
    converting the call for the method of the proxy object to a request;
    transmitting the request to the server-side; and
    invoking a servlet at the server-side to generate a response to the request, wherein the servlet delegates processing of the request to a server object having access to the resource.

2. The method of claim 1, further comprising transmitting the response to the client-side and returning the call for the method of the proxy object.

3. The method of claim 1, wherein a method of the proxy object is called by executing a command on the client-side.

4. The method of claim 1, wherein converting the call for the method of the proxy object comprises marshaling parameters passed to the proxy object.

5. The method of claim 1, wherein the request is a HTTP request.

6. The method of claim 1, wherein transmitting the request to the server-side is based on HTTP protocol.

7. The method of claim 1, wherein transmitting the request to the server-side is based on HTTPS protocol.

8. The method of claim 1, further comprising authenticating the request prior to delegating processing of the request to the server object.

9. The method of claim 1, wherein the servlet delegating processing of the request to a server object comprises the servlet selecting the server object corresponding to the proxy object.

10. A method for executing transactions in a network having a client-side and a server-side, comprising:
    requesting access to a remote workspace by calling a method of a proxy object at the client-side;
    converting the call for the method of the proxy object to a request;
    transmitting the request to the server-side; and
    invoking a servlet at the server-side to generate a response to the request, wherein the servlet delegates processing of the request to a server object having access to the remote workspace.

11. The method of claim 8, wherein transmitting the request comprises using HTTP protocol to transmit the request.

12. The method of claim 8, wherein transmitting the request comprises using HTTPS protocol to transmit the request.

13. A method for executing transactions in a network having a client-side and a server-side, comprising:
    requesting access to a remote resource by calling a method of a proxy object at the client-side;
    converting the call for the method of the proxy object to a request;
    transmitting the request to the server-side using HTTP protocol; and
    invoking a servlet on the server-side to generate a response to the request, wherein the servlet delegates processing of the request to a server object having access to the remote resource.

14. A method for executing transactions in a network having a client-side and a server-side, comprising:
    requesting access to a remote resource by calling a method of a proxy object at the client-side;
    converting the call for the method of the proxy object to a request;
    transmitting the request to the server-side using HTTPS protocol; and
    invoking a servlet on the server-side to generate a response to the request, wherein the servlet delegates processing of the request to a server object having access to the remote resource.

15. A system for remotely accessing a resource in a client-server network, comprising:
    a server application having at least one server object that can access the resource directly;
    a client application comprising an interface through which a method of a proxy object can be called locally and converted to a request;

a servlet that delegates processing of the request to the server object; and a connection for sending the request to the servlet.

16. The system of claim 15, wherein the server application and servlet are deployed on a web server.

17. The system of claim 15, wherein the connection is based on HTTP protocol.

18. The system of claim 15, wherein the connection is based on HTTPS protocol.

19. The system of claim 15, further comprising a mechanism for authenticating the request.

20. The system of claim 15, wherein the resource comprises a workspace.

21. A software configuration management system, comprising:

a server application having at least one server object that can access a workspace;

a client application comprising an interface through which a method of a proxy object can be called locally and converted to a request;

a servlet that delegates processing of the request to the server object; and a connection for sending the request to the servlet.

22. The software configuration management system of claim 21, wherein the workspace is maintained under a version control system.

23. The software configuration management system of claim 21, wherein the connection is based on HTTP protocol.

24. The software configuration management system of claim 21, wherein the connection is based on HTTPS protocol.

* * * * *